US009628699B2

United States Patent
Cheng et al.

(10) Patent No.: US 9,628,699 B2
(45) Date of Patent: Apr. 18, 2017

(54) CONTROLLING A CAMERA WITH FACE DETECTION

(71) Applicant: Intel Corporation, Santa Clara, CA (US)

(72) Inventors: Liang Cheng, Shanghai (CN); Lili Ma, Shanghai (CN); Hemin Han, Shanghai (CN); David Poisner, Carmichael, CA (US); Duane Quiet, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/387,189

(22) PCT Filed: Nov. 29, 2013

(86) PCT No.: PCT/CN2013/088145
§ 371 (c)(1),
(2) Date: Sep. 22, 2014

(87) PCT Pub. No.: WO2015/077978
PCT Pub. Date: Jun. 4, 2015

(65) Prior Publication Data
US 2016/0156838 A1    Jun. 2, 2016

(51) Int. Cl.
*H04N 5/228*    (2006.01)
*H04N 5/232*    (2006.01)
(Continued)

(52) U.S. Cl.
CPC ......... *H04N 5/23219* (2013.01); *G06F 3/011* (2013.01); *G06K 9/00255* (2013.01);
(Continued)

(58) Field of Classification Search
CPC ........................ H04N 5/23219; G06F 3/011
(Continued)

(56) References Cited

U.S. PATENT DOCUMENTS 9,171,198 B1 * 10/2015 Raffle ............... G06K 9/00281
2008/0089587 A1   4/2008 Kim et al.
(Continued)

FOREIGN PATENT DOCUMENTS

CN    101183429 A    5/2008
CN    101408936 A    4/2009
(Continued)

OTHER PUBLICATIONS

Taiwan Search Report for TW Application No. 103137444, date of completion Nov. 5, 2015, 3 pages.
(Continued)

*Primary Examiner* — Usman Khan
(74) *Attorney, Agent, or Firm* — International IP Law Group, P.L.L.C.

(57) ABSTRACT

An example of an electronic device with a first camera and a second camera is described. The first camera receives a first image stream, and the second camera receives a second image stream that includes a face of a user of the electronic device. The electronic device also includes a camera control module that identifies gesture based on a change in the second image stream, identifies a camera control feature of the first camera based on the gesture, and activates the camera control feature for the first camera.

16 Claims, 9 Drawing Sheets

(51) Int. Cl.
  *G06F 3/01* (2006.01)
  *G06K 9/62* (2006.01)
  *H04N 5/247* (2006.01)
  *G06K 9/00* (2006.01)

(52) U.S. Cl.
  CPC ....... *G06K 9/00335* (2013.01); *G06K 9/6202* (2013.01); *H04N 5/23216* (2013.01); *H04N 5/247* (2013.01); *G06K 9/00221* (2013.01)

(58) Field of Classification Search
  USPC .......................................... 348/222.1, 333.01
  See application file for complete search history.

(56) References Cited

U.S. PATENT DOCUMENTS

| 2011/0076003 | A1 | 3/2011 | Cho et al. | |
| 2012/0038675 | A1* | 2/2012 | Johnson | G06F 1/1686 345/660 |
| 2012/0281129 | A1* | 11/2012 | Wang | H04N 5/23219 348/333.01 |

FOREIGN PATENT DOCUMENTS

| CN | 203070205 U | 7/2013 |
| CN | 103379224 A | 10/2013 |
| EP | 2 661 068 A2 | 11/2013 |
| TW | 201138440 A | 11/2011 |

OTHER PUBLICATIONS

International Search Report and Written Opinion received for PCT Patent Application No. PCT/CN2013/088145, mailed on Sep. 5, 2014, 16 pages.

* cited by examiner

CONTROLLING A CAMERA WITH FACE DETECTION

CROSS REFERENCE TO RELATED APPLICATIONS

Pursuant to 35 U.S.C. §371, this application is the United States National Stage Application of International Patent Application No. PCT/CN2013/088145, filed on Nov. 29, 2013, entitled "CONTROLLING A CAMERA WITH FACE DETECTION", which is incorporated by reference herein in its entirety.

TECHNICAL FIELD

The present disclosure relates generally to techniques for controlling an electronic device. More specifically, the present disclosure relates generally to techniques for controlling a camera using face detection.

BACKGROUND ART

Many electronic devices, such as smartphones and tablet computers, have integrated cameras that allow users to capture digital pictures. To capture a picture, the user can enter a camera mode that enables the user to use the device like a camera. During camera mode, the display of the device is used as a sort of viewfinder that shows the image that will be captured. If the display is a touchscreen, the display can also serve as an input device. For example, the user may be able to press a virtual button on the display to capture a picture. Even prior to capturing the picture, the user may have the ability to press regions of the screen to change the focus target, disable the flash, or change the zoom, for example. If the device user is holding the device chassis in one hand and using the other hand to press buttons on the display, the stability of the devices camera may be compromised resulting in extra movement of the chassis and additional blur in the captured picture. Furthermore, if the device user only has one hand free, the user may not be able to make the desired camera adjustments or capture an image.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
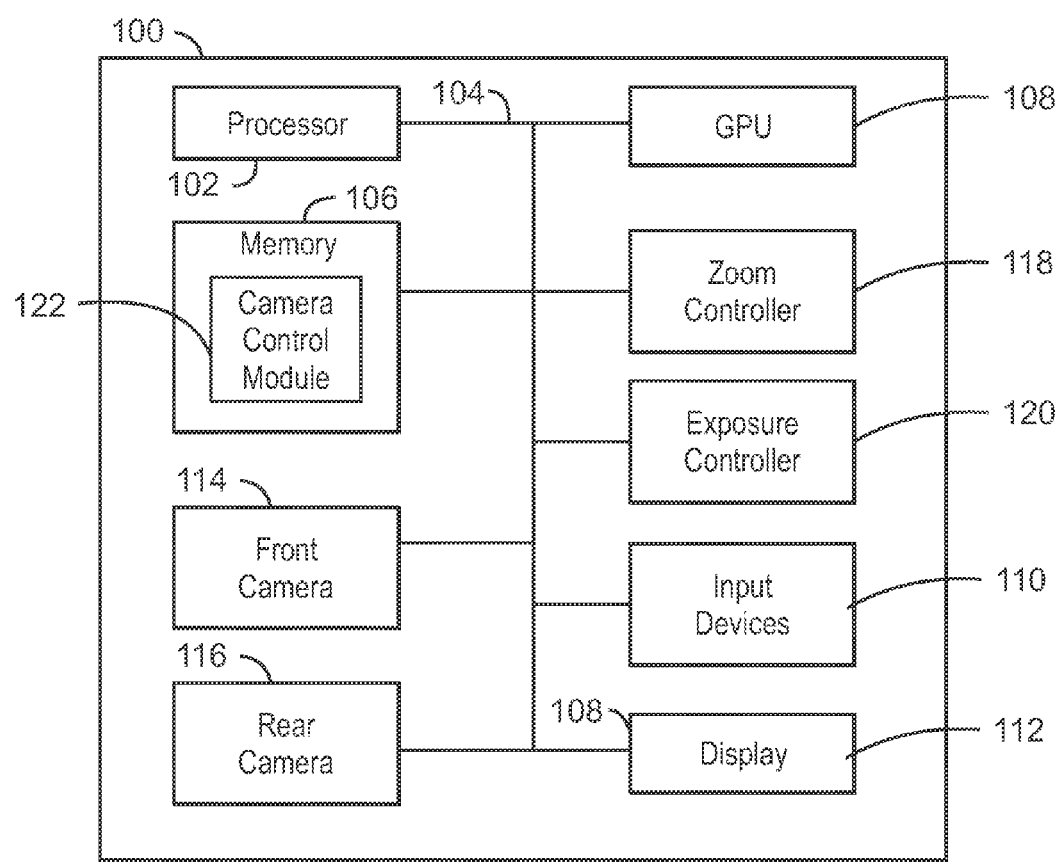
FIG. 1 is a block diagram of an electronic device that uses face detection to control a camera.

The present disclosure is related to techniques for using facial detection to control a camera in a device with a front-facing camera and a rear-facing camera. The front-facing camera points in the same direction as the display so that it can be used, for example, to capture the user's face for video conferencing. The rear-facing camera points in the opposite direction from the front-facing camera and the display. The rear-facing camera is the camera that would most often be used for capturing digital pictures or digital video to be stored to the user's device.

The front-facing camera can be used to detect the face of the camera user. Changes in the image of the user's face can be used to control the rear-facing camera, which may be pointed at a scene that the user is trying to capture. For example, the user may move the camera away from or toward their face. The front-facing camera can detect the change in the apparent size of the user's face and use that information to control some feature of the rear-facing camera, such as changing the zoom factor. As used herein, the term "gesture" refers to any user action that can cause a change in the image stream of the front-facing camera. Gestures that may be detected and used for controlling the rear-facing camera include, but are not limited to, head movements, eye movements, blinking, winking, shoulder shrugging, sticking out the tongue, smiling, frowning, movements of the camera that cause changes in the rear-facing image such as movements away from or toward the user's face or tilting the camera, which causes the size or position of the image captured by the rear-facing camera to change. Any control feature of the rear-facing camera can be paired with any gesture. The control features include, but are not limited to, zoom, focus depth, focus position, shutter speed, image capture, mode changing, and toggling various features, such as flash, toggling between picture mode and video mode, enabling a burst mode, etc.

With the present techniques, the front-facing camera can be used to receive a stream of images of the user's face at the same time that the back-facing camera is used to capture a picture (such as a landscape or of a group of people). The stream of images received by the front facing camera can include one or more frames of image data. The device uses the image stream from the front-facing camera to derive the user's gestures, such as facial expressions, head movements, camera movements, and the like. Based on the various gestures, the device initiates actions that would otherwise have to be done using fingers on the touchscreen or pressing buttons on the side of computing device.

The techniques described herein enable a user to keep both hands on the chassis of the device while controlling the device's camera, which can increase stability and reduce image blur. The techniques described herein may also enable the user to fully operate the camera with a single hand, which may be useful when the user only has one hand free for both carrying the device and controlling the camera. When using one hand to carry and control the camera, either hand may be used while still being able to access all of the camera's control features.

FIG. 1 is a block diagram of an electronic device that uses face detection to control a camera. The electronic device 100 may be any suitable electronic device including a mobile phone, a smart phone, a tablet computer, a laptop computer, or a digital camera, among others. The device 100 may include a processor 102 that is configured to execute stored instructions. The processor 102 can be a single core processor, a multi-core processor, a computing cluster, or any number of other configurations. Furthermore, the device 100 may include more than one processor 102. The processor 102 may be coupled to other components of the device 100 by a bus 104.

The device 100 can also include memory 106. The memory 106 can include volatile memory, non-volatile memory, or any combination thereof. The memory 106 may be used to store user data, such as image and video data, as well as instructions executable by the processor, such as an operating system, applications, and other programming code. Examples of non-volatile memory include, but are not limited to, electrically erasable programmable read only memory (EEPROM), read only memory (ROM), flash memory, and other solid state memory types such as memristor memory. Examples of volatile memory include, but are not limited to, static random access memory (SRAM), and dynamic random access memory (DRAM).

In some embodiments, the device 100 includes a graphics processing unit (GPU) 108 in addition to the processor 102. The GPU 108 may be configured to perform any number of graphics operations within the device 100. For example, the GPU 108 may be configured to render or manipulate graphics images, graphics frames, videos, or the like, to be displayed to a user of the device 100. In some embodiments, the GPU 108 includes a number of graphics engines (not shown), wherein each graphics engine is configured to perform specific graphics tasks, or to execute specific types of workloads. In some embodiments, the device 100 does not include a GPU 108, and the graphics processing operations are performed by the processor 102.

The processor 102 may be connected through the bus 104 to various input devices 110, which may include, for example, buttons, touchscreen, and any other suitable controls, among others. The input devices 110 may be used to control the device 100. For example, many of the camera control features may be accessed through the input devices 110. The processor 102 may also be linked through the bus 104 to a display 112. The display 112 may include a display screen that is a built-in component of the device 100. The display 112 may be integrated with a touchscreen input device.

The device 100 also includes two or more cameras, including a front-facing camera 114 and a rear-facing camera 116. The front-facing camera 114 is the camera that is pointed in the direction of the user when the user is using the device 100 in the usual manner, in other words, facing the display 112 and the input devices 110. The rear-facing camera 116 is the camera that points outward from the back of the device 100, in other words, the side opposite of the display 112 and input devices 110. The rear-facing camera 116 may be a high-resolution camera and would typically be the camera that would be used for taking pictures and recording video. Each of the cameras 114 and 116 may include any suitable type of image sensors that can capture an image for storage to a computer-readable memory device. For example, the cameras may include charge-coupled device (CCD) image sensors, complementary metal-oxide-semiconductor (CMOS) image sensors, system on chip (SOC) image sensors, image sensors with photosensitive thin film transistors, or any combination thereof. In some examples, the rear-facing camera includes more than one image sensor and corresponding lens or set of lenses. For example, the rear-facing camera could be a 3D camera used to capture three-dimensional images.

One or more of the cameras 114 and 116 may include a zoom controller 118, which controls the zoom factor of the camera. In some examples, the zoom factor may adjusted by moving a lens of the camera, and the zoom controller 118 may include or be coupled to a motor for moving one of the lenses. In some examples, the rear-facing camera 116 includes a zoom controller 118, but the front-facing 114 camera does not. One or more of the cameras 114 and 116 may also include an exposure controller 120 that controls the exposure or sensitivity of the camera's image sensor to incoming light. For example, if the camera includes a mechanical shutter, the exposure controller 120 can include circuitry for controlling the shutter speed and the shutter aperture. The exposure controller 120 can control the brightness of a captured image, the depth of field of the captured image, and other effects. The device 100 may also include other controllers not shown in FIG. 1.

The device 100 also includes a camera control module 122, which includes logic for controlling the front camera and rear camera. The camera control module can control the cameras by sending commands to the zoom controller and the exposure controller, for example. The camera control module 122 is implemented as hardware or a combination of hardware and software. For example, as shown in FIG. 1, the camera control module 122 may be configured as stored programming instructions to be executed by the processor 102. However, in some examples, the camera control module 122 is implemented as one or more computer chips (not shown) that can communicate with the processor 102. For example, the camera control module 122 can be included in an Application Specific Integrated Circuit (ASIC), a Field Programmable Gate Array (FPGA), or other special-purpose integrated circuit or circuits.

The camera control module 122 enables a user to control the rear-facing camera 116 by various gestures that are received by the front-facing camera 114. When the device is in camera mode, a stream of image data may be received by the rear-facing camera 116, processed, and displayed on the display 112 for viewing by the user. Meanwhile, the front-facing camera 114 can be receiving a stream of image data that is processed to identify gestures that indicate a particular camera control that the user desires, such as zooming in or out, changing the focus, changing the light exposure, or toggling a particular feature such as a flash. Various examples will be described further below. The block diagram of FIG. 1 is not intended to indicate that the device 100 is to include all of the components shown in FIG. 1. Further, the device 100 may include any number of additional components not shown in FIG. 1, depending on the details of the specific implementation. For example, although embodiments are being described herein as including a front-facing camera and a rear-facing camera, other embodiments can include different arrangements of cameras. For example, the cameras may be arranged at some other angle other than facing 180 degrees away from each other, including being mounted on the same side of the electronic device 100.

Figure 2:
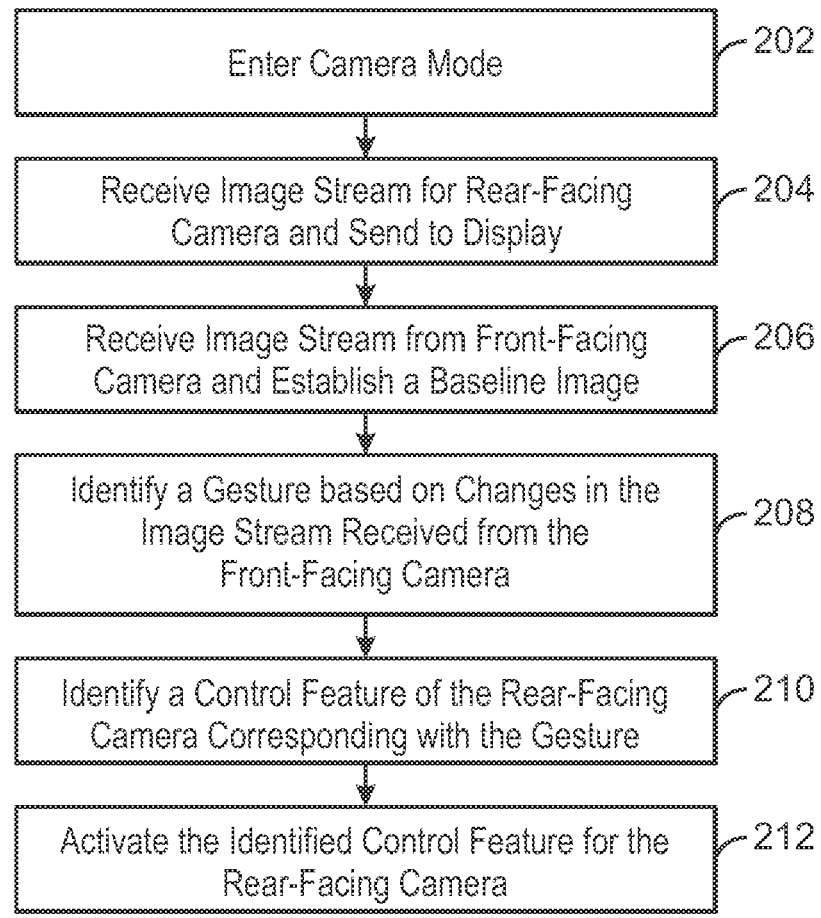
FIG. 2 is a process flow diagram of a method of controlling a camera using face detection.

FIG. 2 is a process flow diagram of a method of controlling a camera using face detection. Throughout the description of method 200, reference may occasionally be made to FIG. 1. The method 200 may be performed by any suitable electronic device that includes a front-facing camera and a rear-facing camera. The method 200 may be performed, for example, by the camera control module 122 of the electronic device 100 shown in FIG. 1.

The method 200 may begin at block 202, wherein the device enters camera mode. During camera mode, the device is receiving image data and can receive camera control instructions from the user, such as an instruction to capture an image. Also during camera mode, the device's display may be serving as a viewfinder and displaying an image stream from the rear-facing camera. If the device is a tablet computer, for example, camera mode may be activated by the user by selecting a camera application. If the device is a digital camera, camera mode may be activated when the device is turned on. During "camera mode," the user will be able to capture images or video. Furthermore, "capturing" refers to acquiring an image or video so that it can be stored for later retrieval and viewing. In other words, an image is captured when the user takes a picture as opposed to simply viewing an image stream on the display. Similarly, video is captured when the user instructs the camera to record.

At block 204, an image stream is received from the rear-facing camera and sent to the display. As explained above in relation to FIG. 1, the display is on the opposite side of the device from the rear-facing camera. The image stream sent to the display from the rear-facing camera enables the user to see the image that would be captured if the user takes a picture. Additional graphics may be shown on the display in addition to the image from the rear-facing camera. For example, a focus target indicator may be displayed on the screen to indicate the part of the image that is going to be used to automatically focus the camera. Additionally, an exposure target indicator may be displayed on the screen to indicate the part of the image that is going to be used to automatically adjust the image brightness. The focus target and the exposure target can be moved to different parts of the image by the user. To move the focus target or the exposure target, the user can use various input devices. For example, the user can move the focus target or the exposure target by touching a different point on the touch screen display. Additionally, the user can also move the focus target or the exposure target through gestures that can be received by the front-facing camera and identified by the camera control module 122. A variety of other information may also be displayed such as mode indicators, and whether a camera flash is on or off. In some embodiments, control features may also be displayed on the display, such as buttons, sliders, and the like. For example, the display may include a button that toggles the flash or enables the user to capture an image or begin recording video.

At block 206, an image stream is received from the front-facing camera. As described above in relation to FIG. 1, the front-facing camera is the camera that faces the display and is likely pointed at the user. The image stream may be received by the camera control module 122 shown in FIG. 1. The camera control module 122 can be configured to identify a human face. To be able to identify gestures, a baseline image of the users face may be established. The establishment of the baseline image may be triggered manually by the user or automatically. For example, the user may trigger the establishment of the baseline image manually by providing input to the camera, such as by pressing a physical button or touching a virtual button on the touch screen display. The camera control module 122 may establish the baseline image automatically by ensuring that the image has not changed significantly for a specified period of time. For example, a threshold level of movement may be specified, and if the threshold level of movement is not exceeded for a specified period of time, the camera control module 122 can store the present image for use as the baseline image. In some embodiments, features of the baseline image can identified and their positions within the image can be mapped. For example, the outline of the user's face can be identified, and the positions of various facial features can be mapped, such as the eyes, ears, nose, mouth, etc. Other features may also be mapped, such as the shoulders, for example. In some examples, a single image frame can be used to identify gestures, in which case, a baseline image may not be established. For example, upon detecting a face of a user, the camera control module 122 may be able to determine that one eye is open and one eye is closed in a single image frame.

At block 208, the image stream from the front-facing camera is processed to identify gestures. Gestures can be identified based on changes in the front-facing image stream. For example, gestures can be identified by comparing the current image to the baseline image. Movements of the user's head, or shoulders, or specific features of the user's face, can be detected by comparing the current image and the baseline image. Additionally, movement of the camera relative to the user will cause image-wide changes that can also be detected. For example, tilting the device upward will cause all of the image features to shift downward in the image. Moving the device away from the user will cause the user's face to appear smaller. Some of the detected changes will correspond with specific gestures that the camera control module is configured to recognize as camera control gestures. Gestures that the camera control module 122 can be configured to recognize include head movements, facial movements, movements of the shoulders, or image wide movements that indicate movement of the device. Examples of head movements that may correspond with specific gestures include tilting the head up, down, or to the side, rotating the head to the left or right, or shaking the head, among others. Examples of facial movements that may be identified as gestures include blinking, winking, opening or closing the mouth, smiling, frowning, and sticking out the tongue, among others. Examples of image-wide gestures include tilting the device upward, downward, to the left, or to right, moving the device closer or further way, and shaking the device, among others. Other examples of gestures include shrugging the shoulders or one shoulder. In some embodiments, gestures can be identified by a device other than a camera such as a motion detector, a sensor, a distance measuring device, and the like.

At block 210, the gesture identified at block 208 can be used to identify a camera control feature applicable to the rear-facing camera. Any camera control feature can be controlled by a corresponding gesture. The possible camera control features that may be controlled by gestures include, but are not limited to zoom factor, focus distance, depth of field, focus target, picture brightness, exposure target, flash on or off, the toggling of various camera modes, such as red eye reduction, burst mode, camera mode versus video mode, modes that effect shutter aperture, and shutter speed, among several others.

The correlation between the specific gestures and their corresponding control features can be pre-programmed in the device. For example, the device may include a lookup table that correlates each gesture with its corresponding control feature. For example, if a wink is identified as a gesture, the gesture may be assigned a particular identifier and used to retrieve a corresponding control feature from the lookup table. In the present example, the wink gesture may correspond with a control feature that is a command to capture an image. The device can also include a customizer utility that enables the user specify which gestures are paired with which control features. In this way, the correlation between the gestures and the camera control features can vary from user to user. For example, a camera that is owned by two people may have two separate sets of correlations. For one user, a wink could trigger one camera control action, and for another user, a wink could trigger a different camera control action. This may be useful for cases where one user struggles with a particular gesture.

Various gestures will be complimentary, meaning that they have an opposite gesture, and are therefore suitable for being paired with control features that are also complimentary. For example, winking the left eye is complimentary to winking the right eye. Similarly, shrugging the left shoulder is complimentary to shrugging the right shoulder. Smiling is complimentary to frowning. Such complimentary gestures can be paired with complimentary control features. For example, a smile gesture may be paired with the control feature of zooming in, while a frown gesture may be paired with the control feature of zooming out. The gesture of tilting the head to the left can be paired with the control feature of moving the focus target to the left, and the gesture of tilting the head to the right can be paired with the control feature of moving the focus target to the right.

Various gestures may be considered to be directional gestures and are therefore suitable for being paired with control features that are also directional. For example, upward, downward, leftward, and rightward tilts of the head can be paired with the corresponding upward, downward, leftward, and rightward movements of the focus target or exposure target.

Some gestures may be considered to be activation gestures, which are gestures that activate a particular result, such as image capture (i.e., taking a picture), toggling a feature on and off, or advancing through a list of available features. For example, the gesture of sticking out the tongue, winking, or blinking may be paired with the control feature of taking a picture. If blinking is used as a gesture, the gesture may be identified by a rapid succession of blinks to distinguish the gesture from a normal blinking of the eyes. The gesture of a quick left-right shaking of the head may be paired with the control feature of activating or deactivating a particular mode such as toggling between a camera mode and video mode, deleting a picture, or exiting camera or video mode, among others. The gesture of opening or closing the mouth may be paired with the control feature of toggling the camera flash on or off.

Any gesture can be paired with any control feature depending on the design considerations of a particular implementation. Various examples of some of the possible pairing are described herein. However, an exhaustive list of every possible embodiment is impractical and many additional pairings between gestures and control features will occur to a person of ordinary skill in the art given benefit of the present disclosure.

At block 212 the identified control feature is activated for the rear-facing camera. For example, if the control feature is a command to zoom in, the camera control module 122 can send a command to the zoom controller 118 to zoom in. If the control feature is a command to increase the brightness of the picture, the camera control module 122 can send a command to the exposure controller 110 to increase the picture brightness. If the control feature is a command to change the exposure target or focus target to another part of the displayed picture, the camera control module 122 can send a command to the change the position of the exposure target or focus target. The above process may be repeated for as long as the device remains in camera mode.

Figure 3A:
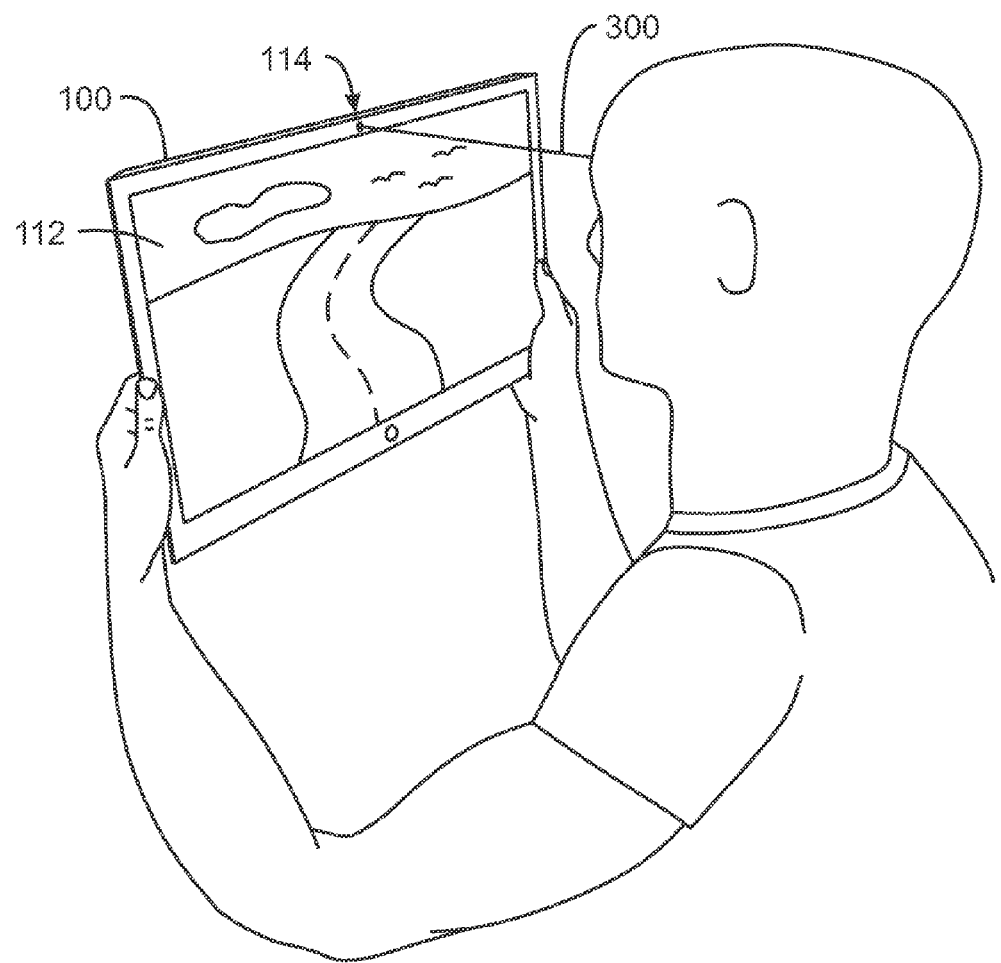
FIGS. 3A, 3B, and 3C illustrate one example of controlling a camera using facial detection.
Figure 3B:
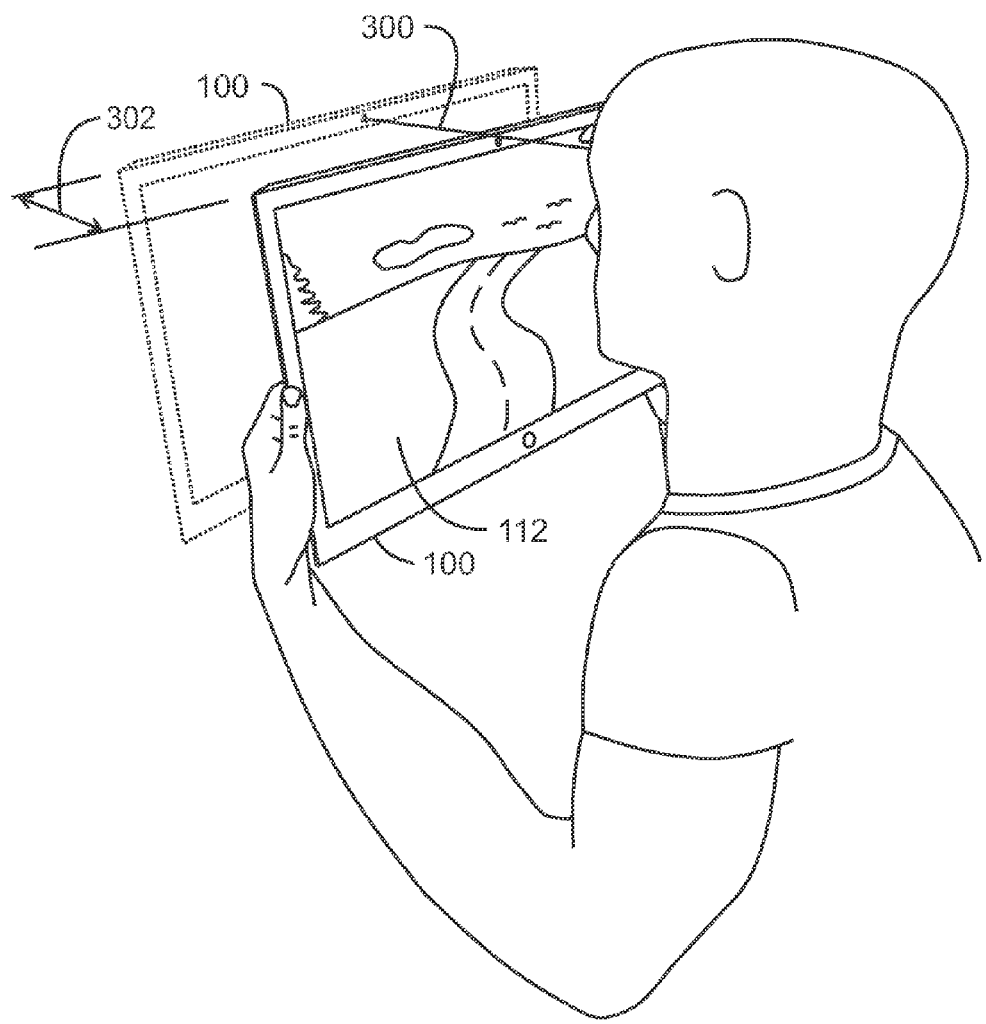
Figure 3C:
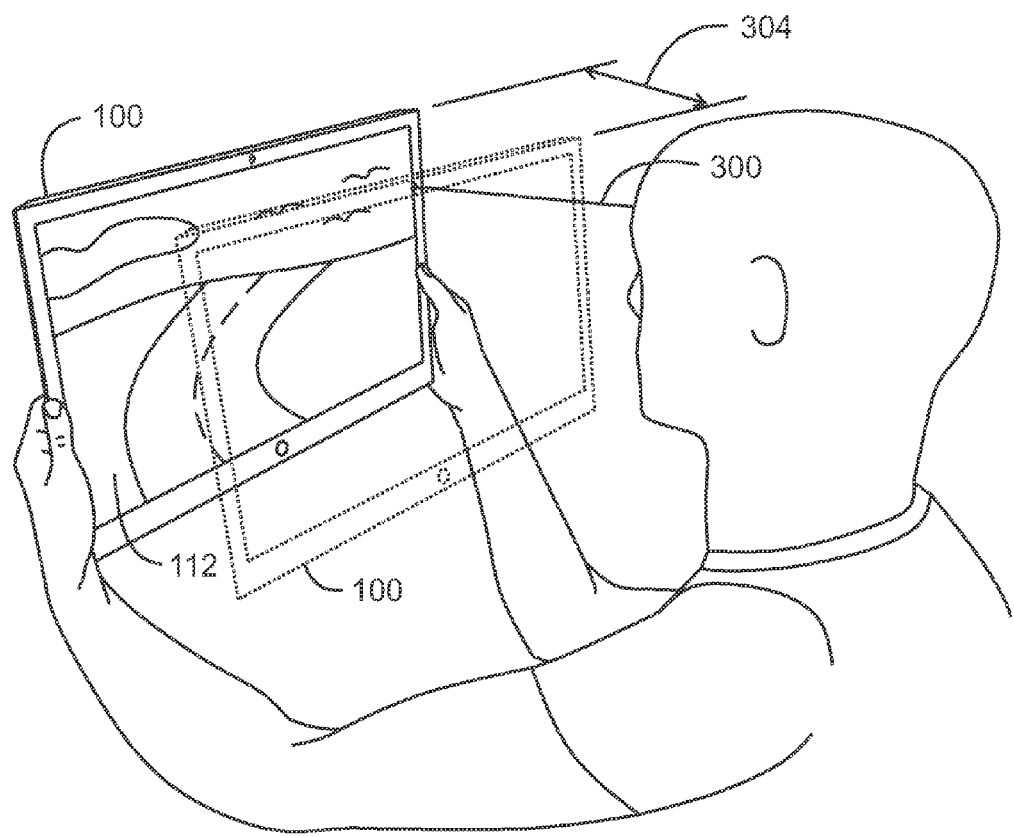

FIGS. 3A, 3B, and 3C illustrate one example of controlling a camera using facial detection. FIG. 3A shows a user holding an electronic device 100, which, in this example, is a tablet computer. The device 100 includes a front-facing camera 114 and a rear-facing camera (not shown). The scene shown on the display 112 is being received from the rear-facing camera. Images are also being received by the front-facing camera 114, but these images are not being displayed on the device 100. Furthermore, FIG. 3 shows the user establishing a baseline image as discussed above in relation to block 206 of FIG. 2. In this example, the baseline image corresponds with a baseline distance 300.

FIG. 3B shows the user moving the device closer after having established the baseline image. The original position of the device 100 at the time that the baseline image was established is shown with dotted lines. The difference between the original position of the device 100 and the current position of the device 100 is shown as the distance change 302. The distance change 302 may be detected as a gesture that can be used to control the rear-facing camera. For example, the distance change 302 may be used to change a zoom factor of the rear-facing camera. Furthermore, the change in the zoom factor may be proportional to the magnitude of the distance change 302. In some embodiments, moving the device 100 closer causes the zoom-factor of the rear-facing camera to gradually decrease (in other words, zoom out) proportionally.

FIG. 3C shows the user moving the device further away after having established the baseline image. The original position of the device 100 at the time that the baseline image was established is shown with dotted lines. The difference between the original position of the device 100 and the current position of the device 100 is shown as the distance change 304. As shown in FIG. 5, moving the device 100 further away causes the zoom-factor of the rear-facing camera to gradually increase (in other words, zoom in) proportionally. Furthermore, the gesture of moving the device closer of further away can also be used to control other features of the rear-facing camera. For example, the gesture described in FIGS. 3A-3C can be used to manually adjust the focus distance closer or further away. Although the baseline distance 300 and the distance changes 302 and 304 are used to explain the present techniques, the baseline distance and the distance change may, in some embodiments, not be directly computed. Rather, the apparent change in the size of the user's face as viewed from the front-facing camera 114 may be used as a substitute for the actual distances. This is described further below in relation to FIG. 4.

Figure 4:
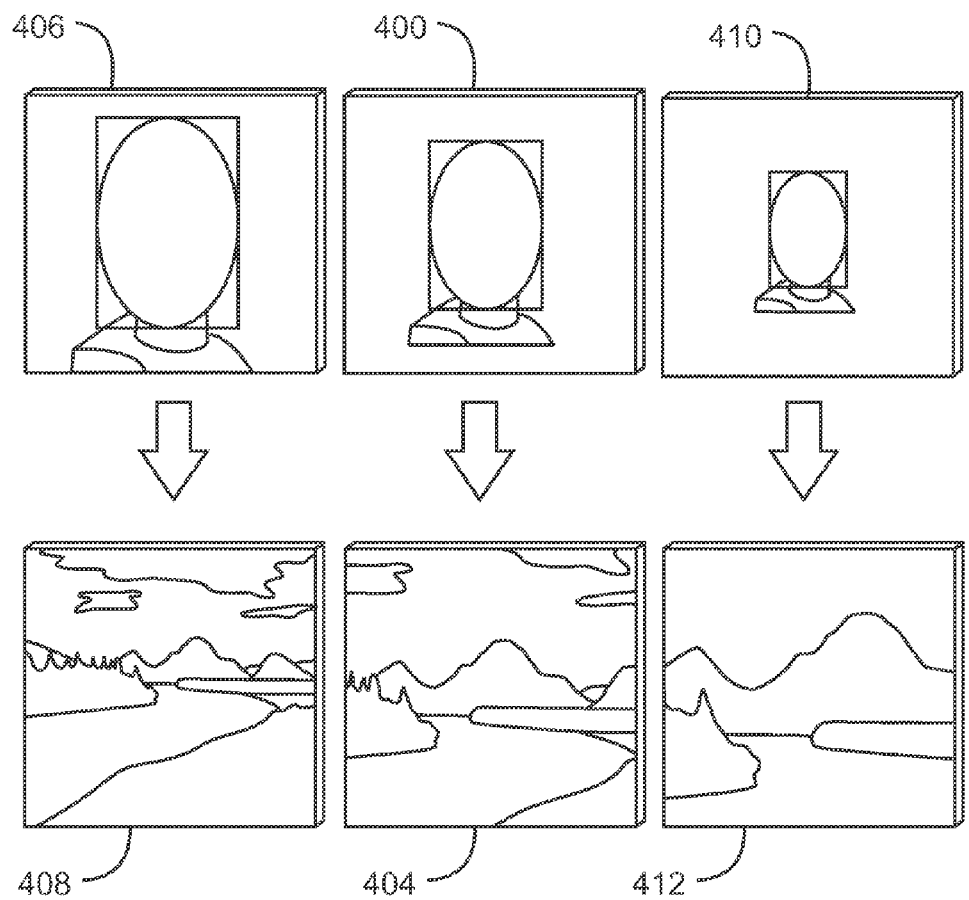
FIG. 4 shows the relationship between the image received by the front-facing camera 114 and the zoom factor of the rear-facing camera 116.

FIG. 4 shows the relationship between the image received by the front-facing camera 114 and the zoom factor of the rear-facing camera 116. Image 400 shows the baseline image established by the front-facing camera 114. In some embodiments, the baseline image 400 is not displayed to the user. The baseline image 400 may be processed to identify the apparent size of the face, as represented by the rectangle around the face. The image 404 represents the image received by the rear-facing camera 114 and displayed to the user when the front-facing camera 116 is at the baseline position.

When the user moves the device 100 closer, as shown in FIG. 3B, the apparent size of the user's face gets larger, as shown in image 406. Moving the device 100 closer may be detected as a gesture corresponding with a command to zoom out, which is reflected in the image 408. When the user moves the device 100 further away, as shown in FIG. 3C, the apparent size of the user's face get smaller, as shown in image 410. Moving the device 100 further away may be detected as a gesture corresponding with a command to zoom in, which is reflected in the image 412.

Figure 5A:
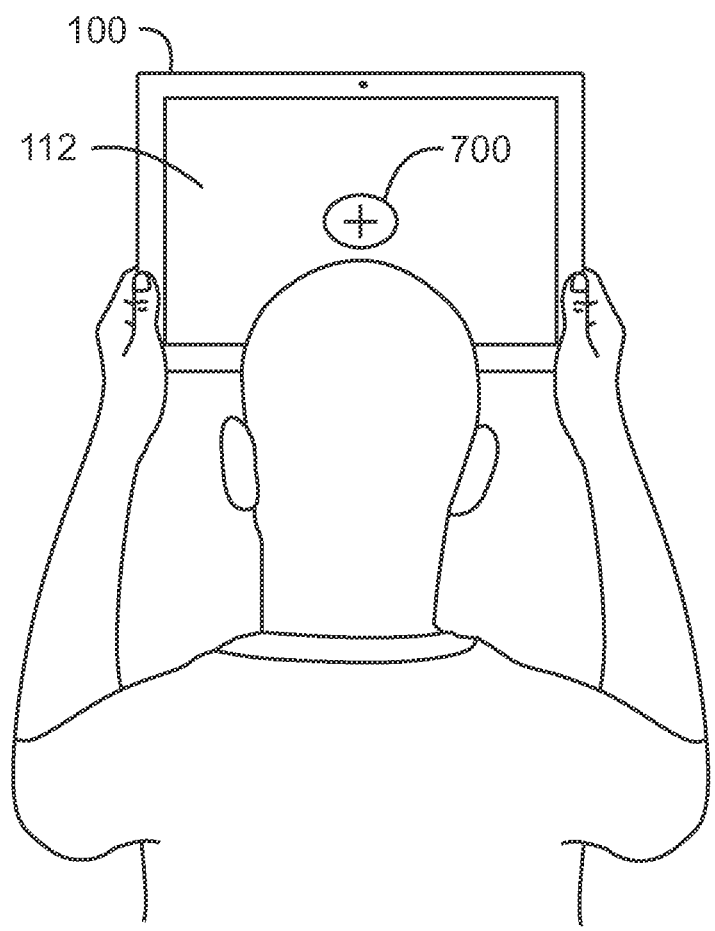
FIGS. 5A, 5B, and 5C illustrate another example of controlling a camera using facial detection.
Figure 5B:
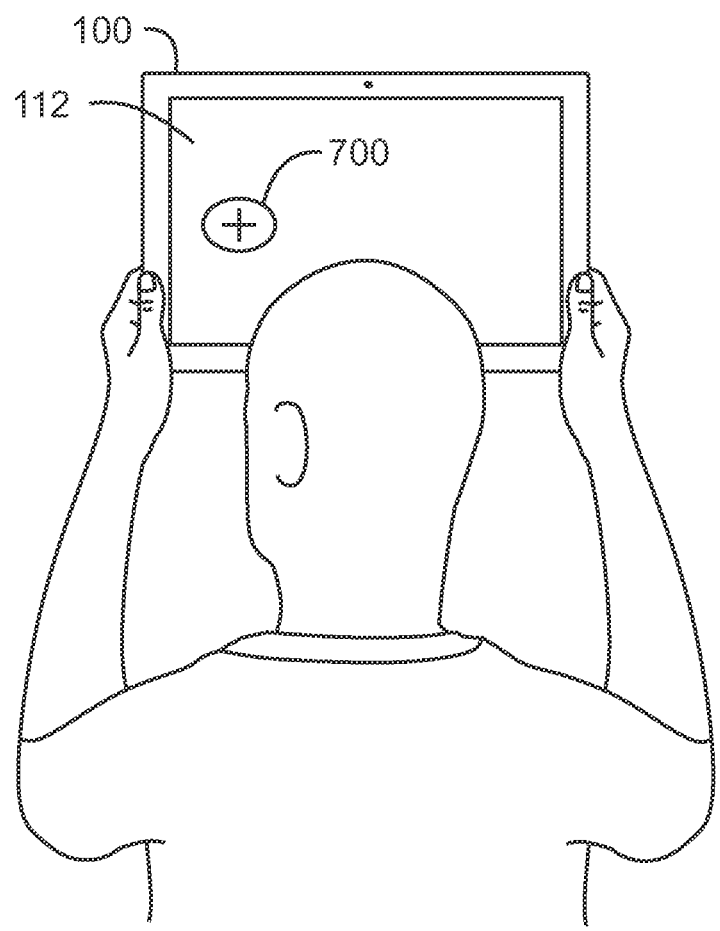
Figure 5C:
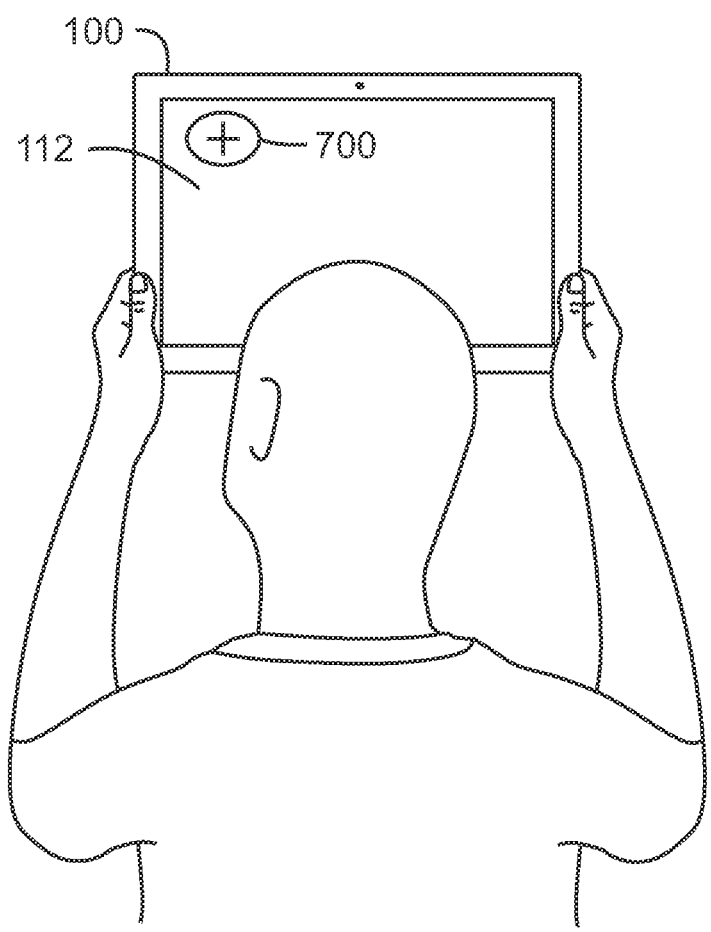

FIGS. 5A, 5B, and 5C illustrate another example of controlling a camera using facial detection. FIG. 5A shows the user holding the device 100 at the position corresponding with the baseline image. As shown in FIG. 5A, the baseline image is established at the time when the user is looking straight ahead and squarely facing the front-facing camera. Thus, in this example, the baseline image of the user's face will appear relatively symmetrical in the front-facing camera.

FIG. 5B shows the user rotating his head slightly to the left. The camera control module 122 can identify this change as a directional gesture corresponding to a directional command such as a command to shift a target point 700 to the left. The target point 700 may be a focus target, or an exposure target, for example. The target point 700 may also be a selection target. In other words, the selection target may be a point on the screen the user wants to select by using another gesture, such as a wink, or sticking out the tongue, among others. In this way, the user may select a virtual button shown on the display 112. Other directional gestures may also be used to issue a directional command. For example, the target point 700 could also be commanded to move to the left by tilting the head to the left rather than rotating.

FIG. 5C shows the user tilting his head back slightly. The camera control module 122 can identify this change as a directional gesture corresponding to a directional command such as a command to shift a target point 700 to upward. In addition to the specific gestures shown in FIG. 5B and 5C, the gesture of tilting the head down may be interpreted as a command move the target point 700 down, and the gesture of rotating the head to the right or tilting the head to the right may be interpreted as a command move the target point 700 to the right. Furthermore, the degree to which the target point is shifted from center may be proportional to the degree of change between the baseline image of the user's face and the present image of the user's face. In some embodiments, commands to move the target point 700 correspond with eye movement gestures rather than head movement gestures.

In the present description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods described herein or a computer-readable medium. Furthermore, although flow diagrams and/or state diagrams may have been used herein to describe embodiments, the present techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

EXAMPLE 1

An example of an electronic device in accordance with the present techniques is provided. The electronic device includes a first camera, a second camera, and a camera control module. The first camera receives a first image stream. The second camera to receive a second image stream that includes a face of a user of the electronic device. The camera control module is to identify a gesture based on a change in the second image stream, identify a camera control feature of the first camera based on the gesture; and activate the camera control feature for the first camera.

In some examples, the camera control module is to establish a base-line image from the second image stream and compare the base-line image to a current image of the second image stream to identify the gesture. In some examples, the gesture is a movement of the electronic device away from the face of the user, and the camera control feature is a command to zoom in. In some examples, the gesture is a wink, and the camera control feature is the activation of an image capture. The gesture can be a compliment of a second gesture and the camera control feature can be a compliment of a second camera control feature controlled by the second gesture.

The gesture can also be a directional gesture and the camera control feature can be a directional camera control feature. For examples, the gesture can be a tilt of the head or a rotation of the head, and the camera control feature can be a command to move a focus target or a command to move an exposure target.

EXAMPLE 2

An example of an electronic device in accordance with the present techniques is provided. The electronic device includes logic to receive a first image stream that includes a face of a user of the electronic device. The electronic device includes logic to identify a gesture based on a change in the first image stream. The electronic device also includes logic to identify a camera control feature of a second camera based on the gesture and activate the camera control feature for the second camera.

In some examples, the electronic device includes logic to establish a base-line image from the first image stream and compare the base-line image to a current image of the first image stream to identify the gesture. In some examples, the gesture is a movement of the electronic device away from the face of the user, and the camera control feature is a command to zoom in. In some examples, the gesture is a wink, and the camera control feature is the activation of an image capture. The gesture can be a compliment of a second gesture and the camera control feature can be a compliment of a second camera control feature controlled by the second gesture.

The gesture can also be a directional gesture and the camera control feature can be a directional camera control feature. For examples, the gesture can be a tilt of the head or a rotation of the head, and the camera control feature can be a command to move a focus target or a command to move an exposure target.

EXAMPLE 3

An example of a tangible, non-transitory, computer-readable medium in accordance with the present techniques is provided. The computer-readable medium includes instructions to direct a processor to receive a first image stream from a first camera. The instructions direct the processor to receive a second image stream from a second camera, wherein the second image stream includes a face of a user of the electronic device. The instructions also direct the processor to identify a gesture based on a change in the second image stream, identify a camera control feature of the first camera based on the gesture; and activate the camera control feature for the first camera.

In some examples, the instructions direct the processor to establish a base-line image from the second image stream and compare the base-line image to a current image of the second image stream to identify the gesture. In some examples, the gesture is a movement of the second camera away from the face of the user, and the camera control feature is a command to zoom in. In some examples, the gesture is a wink, and the camera control feature is the activation of an image capture. The gesture can be a compliment of a second gesture and the camera control feature can be a compliment of a second camera control feature controlled by the second gesture.

The gesture can also be a directional gesture and the camera control feature can be a directional camera control feature. For examples, the gesture can be a tilt of the head or a rotation of the head, and the camera control feature can be a command to move a focus target or a command to move an exposure target

What is claimed is:

1. An electronic device with a camera that is controlled through face detection, comprising:
   a rear-facing camera to receive a rear-facing image stream;
   a front-facing camera to receive a front-facing image stream that includes a face of a user of the electronic device;
   a camera control module to:
      establish a base-line image of the face from the front-facing image stream if the threshold level of movement is not exceeded for a specified period of time;
      identify movement of the electronic device away from the face of the user based on a change in the size of the face in the front-facing image stream compared to the baseline image of the face;
      identify a first camera control feature of the rear-facing camera based on the movement, wherein the first camera control feature is a command to zoom; and
      activate the first camera control feature for the rear-facing camera.

2. The electronic device of claim 1, wherein the camera control module is to identify a wink based on a change in the front-facing image stream compared to the baseline image and, in response to the wink, activate an image capture.

3. The electronic device of claim 1, wherein the camera control module is to:
   identify movement of the electronic device toward the face of the user based on a change in the front-facing image stream compared to the baseline image; and
   identify a second camera control feature of the rear-facing camera based on the movement, wherein the second camera control feature is a command to zoom in an opposite direction compared to the first camera control feature.

4. The electronic device of claim 1, wherein the camera control module is to identify a tilt of the head and, in response to the tilt, activate a directional camera control feature.

5. The electronic device of claim 1, wherein the camera control module is to identify a rotation of the head and in response to the rotation, activate a directional camera control feature.

6. An electronic device with a camera that is controlled through face detection, comprising:
   logic to receive a first image stream via a first camera, wherein the first image stream includes a face of a user of the electronic device;
   logic to establish a base-line image of the face from the first image stream if the threshold level of movement is not exceeded for a specified period of time;
   logic to identify movement of the electronic device away from the face of the user based on a change size of the face in the in the first image stream compared to the baseline image of the face;
   logic to identify a first camera control feature of a second camera based on the movement, wherein the first camera control feature is a command to zoom; and logic to activate the camera control feature for the second camera.

7. The electronic device of claim 6, wherein the camera control module is to identify a wink based on a change in the front-facing image stream compared to the baseline image and, in response to the wink, activate an image capture.

8. The electronic device of claim 6, comprising logic to:
identify movement of the electronic device toward the face of the user based on a change in the first image stream compared to the baseline image; and
identify a second camera control feature of the second camera based on the movement, wherein the second camera control feature is a command to zoom in an opposite direction compared to the first camera control feature.

9. The electronic device of claim 6, comprising logic to identify a directional gesture and move a focus target in response to the directional gesture.

10. The electronic device of claim 6, comprising logic to identify a directional gesture and move a focus target in response to the directional gesture.

11. A tangible, non-transitory, computer-readable medium comprising instructions to direct a processor to:
receive a rear-facing image stream from a rear-facing camera;
receive a front-facing image stream from a front-facing camera, wherein the front-facing image stream includes a face of a user of the electronic device;
establish a base-line image of the face from the front-facing image stream if the threshold level of movement is not exceeded for a specified period of time;
identify movement of the electronic device away from the face of the user based on a change in the size of the face in the front-facing image stream compared to the baseline image of the face;
identify a second camera control feature of the rear-facing camera based on the movement, wherein the first camera control feature is a command to zoom; and
activate the camera control feature for the rear-facing camera.

12. The computer-readable medium of claim 11, wherein the instructions direct the processor to identify a wink based on a change in the front-facing image stream compared to the baseline image and, in response to the wink, activate an image capture.

13. The computer-readable medium of claim 11, wherein the instructions direct the processor to:
identify movement of the electronic device toward the face of the user based on a change in the front-facing image stream compared to the baseline image; and
identify a second camera control feature of the rear-facing camera based on the movement, wherein the second camera control feature is a command to zoom in an opposite direction compared to the first camera control feature.

14. The computer-readable medium of claim 11, wherein the instructions direct the processor to identify a tilt of the head and in response to the tilt activate a directional camera control feature.

15. The computer-readable medium of claim 11, wherein the instructions direct the processor to identify a rotation of the head and activate a directional camera control feature in response to the rotation.

16. The computer-readable medium of claim 11, wherein the instructions direct the processor to identify a directional gesture and move a focus target in response to the directional gesture.

\* \* \* \* \*